US006792429B2

(12) United States Patent
Gilbert

(10) Patent No.: US 6,792,429 B2
(45) Date of Patent: Sep. 14, 2004

(54) METHOD FOR FAULT TOLERANT MODIFICATION OF DATA REPRESENTATION IN A LARGE DATABASE

(75) Inventor: Gary Martin Gilbert, Arlington Heights, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 482 days.

(21) Appl. No.: 10/027,407

(22) Filed: Dec. 19, 2001

(65) Prior Publication Data

US 2003/0115206 A1 Jun. 19, 2003

(51) Int. Cl.[7] .............................................. G06F 17/00
(52) U.S. Cl. ...................................... 707/101; 707/205
(58) Field of Search ............................ 707/100, 101, 707/102, 200, 202, 204, 205, 1, 8, 10; 711/170, 173

(56) References Cited

U.S. PATENT DOCUMENTS

| | | | | |
|---|---|---|---|---|
| 4,267,568 A | * | 5/1981 | Dechant et al. ............. | 707/100 |
| 5,448,727 A | * | 9/1995 | Annevelink ................. | 707/101 |
| 5,758,151 A | * | 5/1998 | Milligan et al. ............ | 707/100 |
| 5,835,915 A | * | 11/1998 | Carr et al. .................. | 707/202 |
| 6,253,300 B1 | * | 6/2001 | Lawrence et al. .......... | 711/173 |
| 6,651,074 B1 | * | 11/2003 | Taylor ........................ | 707/204 |

OTHER PUBLICATIONS

Sockut et al, "Database reorganization, principles and practice", ACM 1979, pp. 371–395.*
Navathe, "Schema analysis for database restructuring", ACM 1980, pp. 157–184.*

* cited by examiner

Primary Examiner—Uyen Le

(57) ABSTRACT

A system and method for restructuring the physical storage of a table of a database. The records of the table are grouped into one or more partitions, each of which is stored in a file having a number of fixed sized blocks. Each of the blocks has a first format. Restructuring the physical storage of the table involves changing, to a second format, the format of the blocks of the file in which a partition of the table is stored. Additionally, control data that includes a catalog table and one or more file labels describing the partitions in which the records of the table are grouped, is altered to indicate that the blocks of a partition are enabled to be stored in the second format. Restructuring occurs in phases so as to minimize the inaccessibility of the table being restructured to updates.

18 Claims, 18 Drawing Sheets

PARTNS

| FILENAME | PRIMARY PARTITION | PARTITIONNAME | CATALOGNAME | FIRSTKEY |
|---|---|---|---|---|
| A | Y | A | ... | 0 |
| A | N | B | ... | 500,000,000 |
| B | Y | A | | 0 |
| B | N | B | | 500,000,000 |

98b

FILES

| FILENAME | PRIMARYEXT / PRIMARYEXT2 | SECONDARYEXT / SECONARYEXT2 | PARTITIONARRAY | FILE FOR MAT |
|---|---|---|---|---|
| A | ... | ... | FORMAT2ENABLED | 1 |
| B | ... | ... | FORMAT2ENABLED | 2 |

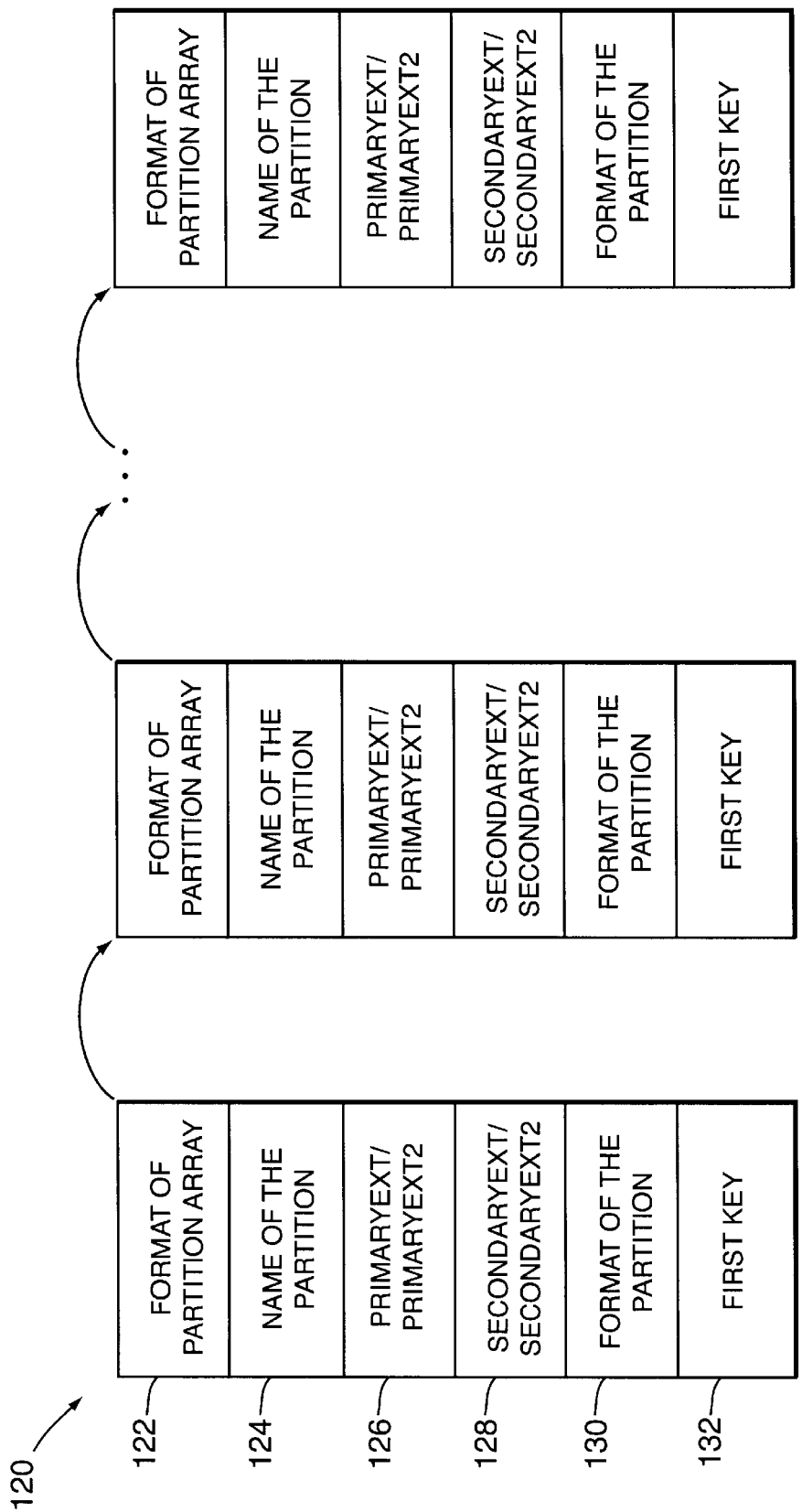

METHOD FOR FAULT TOLERANT MODIFICATION OF DATA REPRESENTATION IN A LARGE DATABASE

CROSS-REFERENCE TO RELATED APPLICATIONS

1. Field of the Invention

This invention is related generally to the restructuring of a database and more specifically to changing the storage format of a database table while maintaining database operability to service transaction requests.

2. Description of the Related Art

FIG. 1 is a diagram of a computer system 10 that includes a database management system (DBMS). The system is a distributed computer system having multiple computers 12, 14, 16 interconnected by local area and wide area network communication media 18. The system 10 generally includes at least one database server 12 and many user workstation computers 14, 16.

The database server 12 includes a central processing unit 20, a primary memory 22, a communications interface 24 for communicating with user workstations 14, 16 as well as other system resources (not shown). The secondary memory 26-1, 26-2, typically a magnetic disk storage system, in the database server 12 contains the tables 30, 32 and other support information managed by the database management system 34. The secondary memory 26-1, 26-2 of the database server 12 also includes programs that manage the database tables and applications programs that users invoke to perform transactions on the database tables. A transaction manager 44 is typically included in the programs that manage the database tables. Not only does the transaction manager 44 coordinate the execution of transactions, it also creates audit entries for each transaction, which are durably stored in an audit trail file 48 in the secondary memory.

The end user workstations 14, 16 typically include as central processing unit (CPU) 50, primary memory 52, a communications interface 54 for communicating with the database server 12, and other system resources, a secondary memory 56, and a user interface 58. The user interface 58 typically includes a keyboard and display device, and may include additional resources such as a pointing device and printer. Secondary storage 56 is used for storing computer programs, such as communications software used to access the database server 12. Some end user workstations 16 may not include secondary memory 56, relying on software that is downloaded to their primary memory 52 from a server computer such as the database server 12.

Database management systems (DBMS) 34 typically manage the storage of database information independently from any co-resident operating system 70, in FIG. 2, in the computer system or systems 68 on which the DBMS 34 is installed. The DBMS 34 conventionally has several layers of software. FIG. 2 shows the layers of the DBMS 34 and their relationship to the general computing system. The DBMS includes a User Interface 72, an Application Programming Interface (API) 74, a Catalog Manager 76, a Relational Engine 78, and a Data Access Manager 80, which has access to a disk volume 82.

Requests for DBMS functions originate from a user via the User Interface 72 or from a program via the API 74. The request usually takes the form of a command expressed in the SQL language.

The Catalog Manager 76 accepts requests for the creation, deletion or modification to the definition of database objects such as tables. The metadata for these database objects is under the control of the Catalog Manager 76 and includes a catalog 92 (in FIG. 3A) and one or more file labels 96a–c (in FIG. 3A); the catalog contains a set of tables 98a–c (in FIG. 3A) describing the various data tables, indexes and views of the database; and the file labels 96a–c are encoded forms of file and catalog information.

The Relational Engine 78 accepts requests from the API 74 for manipulation of the contents of the database objects and supports the concept of a logical table of database records.

The Data Access Manager 80 accepts requests from the Relational Engine 78, and the Catalog Manager 76. These requests cause the contents of portions of the tables to be inserted, deleted, or modified. In addition, requests from the Catalog Manager 76 allow the metadata contained in the file labels 96a–c to be modified.

FIG. 3A is a diagram of the pertinent logical structures in the DBMS 34. The DBMS contains a data dictionary 90 that includes a catalog 92 and a directory 94. The data in the DBMS includes base tables 100, 102, 104 for storing user data, and index tables 106, 108, 110 which facilitate the access to the base tables 100, 102, 104. Base tables 100, 102, 104 and index tables 106, 108, 110 are divided into partitions, p1, p2 p3 as shown, the division being based on the records (rows) that satisfy a certain constraint. In some cases, a table has only one partition, which means that the partition includes all of the records of the table. The catalog 92 includes one or more tables 98a–c for describing the data tables and index tables in the data portion 112 of the DBMS.

One of these tables is the PARTNS table 98b and another is the FILES table 98a. Referring to FIG. 3B, the PARTNS table 98b includes the following fields, FILENAME, PRIMARYPARTITION, PARTITIONNAME, CATALOGNAME, and FIRSTKEY. The FILENAME field contains the name of the file in which the partition is stored, the PRIMARY field contains a flag indicating whether the named partition is a single partition or the first in a set of partitions, the field PARTITIONNAME contains the name of the partition, the CATALOGNAME contains the name of the catalog in which the PARTNS catalog table is found, and the FIRSTKEY field defines the group of records of the table that are in the partition.

In the example shown in FIG. 3B, there are two partitions of the table, partition A and partition B. These partitions are each stored in a file having the same filename as the partition, file A for partition A and file B for partition B. The first and second records of the table pertain to partition A and the third and fourth records of the table pertain to partition B.

The FILES table 98a includes the following fields, among others that are not pertinent to the present invention, FILENAME, PRIMARYEXT, PRIMARYEXT2, SECONDARYEXT, SECONDARYEXT2, PARTITIONARRAY, and FILEFORMAT. The FILENAME contains the name of the file that holds a partition, the PRIMARYEXT contains a number telling the Data Access Manager 80 how to manage the initial allocation of physical space on the disk volume for a Format 1 file, the PRIMARYEXT2 is similar to the previous field except allocation is for a Format 2 file, the SECONDARYEXT field contains a number telling the Data Access Manager how to manage subsequent allocations of physical space on the disk volume for a Format 1 file, SECONDARYEXT2 is the same as the previous field except allocation is for a Format 2 file, PARTITIONARRAY indicates whether the partition array is Format1Enabled or Format2Enabled, and FILEFORMAT contains the format of the file named in the record. In the example shown, files A and B are both Format2Enabled but file A is stored in Format 1, whereas file B is stored in Format 2.

The directory part 94 of the data dictionary includes one or more file labels 96a–c which, as mentioned above, store encoded information about the tables, partitions thereof, and files that contain a table partition.

FIG. 4A is a diagram showing a partition array 120 within the catalog. The partition array 120 is an ordered list of partition information that describes the criterion by which the records of a table are grouped together to create a partition. The criterion is based upon the primary key of the base table, the primary key being one or more of the fields of a database table record whose values uniquely identify the row of a table and determine the order in the table in which the records are stored. All partitions of a database table have the same partition array encoding, independent of the fact that a particular partition of the partition array may be stored in Format 1 or Format 2. Within a Format1Enabled table, all partitions are stored as Format 1. Within a Format2Enabled table, individual partitions are stored as either Format 1 or Format 2.

Each partition array element includes fields from the PARTNS catalog table 98b and the FILES table 98a, In particular, an element of the partition array 120 includes the format of the partition array 122, the name of the partition of the table 124, the primary 126 and secondary 128 extent allocation numbers, the format of the partition 130, and the first key value 132 for the partition.

FIG. 4B is a diagram showing the partition array 134 within the file labels of a Format1Enabled table. The format of the partition array 136 itself is stored separate from the partition array elements 138a–c as it applies identically to each element of the array while each partition array element 138a–c includes the name of the partition of the table 140, the primary 142 and secondary 144 extent allocation numbers, the format of the partition 148, and the first key value for the partition 150.

FIG. 5 is a diagram showing index blocks and data blocks in a file 170, which is defined as a collection of fixed-sized blocks 172a–j. A file 170 is a unit of physical storage and collections of files are stored on disk volumes 82 (in FIG. 2). A file 170 is completely contained on a single disk volume and is therefore limited to the size of the disk volume. A partition, as defined above, is contained in a single file and a single file contains a partition, so that there is a 1:1 relationship between a file and a partition. Therefore, the size of a partition is limited by the size of a single disk volume. FIG. 5 shows the index blocks 172a–g arranged to form a tree, such as a B-tree, with blocks at the end nodes of the trees pointing to the data blocks 172h–j, though this organization of index blocks is not essential to the invention. Files 170 are tracked by the directory 94 (in FIG. 3A) which contains one file label for each file.

Currently, the size of the fields in the catalog, directory and the index and data blocks themselves, limit the size of a partition of an SQL table to about two gigabytes (2 GB). However, it is desirable to have partitions of tables greater than two gigabytes to create larger tables, which are limited by the size of the partitions multiplied by the number of partitions. Creating larger tables poses a significant problem, though, for existing, operating databases because the size of critical fields in the metadata must be increased without significantly interfering with the operation of the database. It also means that the software must be able to recognize and handle multiple control field formats, one for existing data and one for new data.

Conventionally, one way to address these problems has been to take the DBMS down while data is converted from the old format to the new format. Conversion is typically performed by a custom program that reads the old data format and writes the new data format. For large databases, the time to convert the data is sufficiently long that the amount of downtime is unacceptable. To minimize this impact, a second system is sometimes utilized. The computer hardware for the original DBMS system is replicated, a snapshot of the user data is taken and the data is converted to the new format on the replica system. Both the original DBMS system and the replica DBMS system are operated in parallel, with each system processing user transactions. After a period of time, a switch is made so that the replica system becomes the primary system in support of the DBMS.

The conventional approach to restructuring the database to change the size of the tables clearly has drawbacks. Either there is a long downtime during which users cannot use the DBMS application or there is the expense of replicating and operating a system in parallel to minimize the downtime. Furthermore, a custom program is required to restructure the tables.

There is, thus, a need for a method of restructuring a database that avoids the expense of replicating and operating a duplicate machine, and a custom conversion program, while guaranteeing a smooth transition to the new data format without significantly interfering with the users' access to the DBMS.

BRIEF SUMMARY OF THE INVENTION

The present invention is directed towards the above need. A method in accordance with the present invention is a method of restructuring the physical storage of a table in a database. The table has a plurality of records and one or more partitions into which records of the table are grouped. Each partition is stored in a file made up of a number of fixed-size blocks. The database further includes control information describing the table, associated files and partitions, and an audit trail describing updates, if any, to the records of the table. The steps of restructuring the physical storage of a table include altering the control information to indicate that each partition of the table has a first format in which each partition is currently stored in a first storage unit and updating the control information to indicate that each partition of the table is enabled to be stored in a second format. Next, a partition to be restructured is selected. The blocks of a first file, stored in a first location of the first storage unit and containing the selected partition of the table, are copied from the first storage location to a second file at a second storage location of the second storage unit, while allowing updates to the table, including updates to the selected partition in the first file. The blocks in the second file are altered to have the second format and any records in the selected partition in the second file are updated based on the audit trail, while allowing updates to the table including updates to the selected partition at the first storage location. After updating any records in the second file based on the audit trail, the table is locked to prevent updates to the table. The records in the selected partition at the second storage location are updated, as needed, based on the audit trail, while the table is locked and the table is then unlocked to allow updates to the table including updates to the selected partition at the second storage location.

Another method, in accordance with the present invention includes selecting a partition to be restructured, where the selected partition is stored in a second file with a second format, and copying the blocks of the second file, stored in a second location of a second storage unit, from the second storage location to a first file at a first storage location of a first storage unit, while allowing updates to the table, including updates to the selected partition in the second file. The blocks in the first file are altered to have a first format and any records in the selected partition in the first file are updated based on the audit trail, while allowing updates to the table including updates to the selected partition at the second storage location. Next, the table is locked to prevent updates to the table, after updating any records in the first file based on the audit trail and any records in the selected partition at the first storage location are updated, as needed, based on the audit trail, while the table is locked. The table is then unlocked to allow updates to the table including updates to the selected partition at the first storage location.

The above method includes changing the format of a partition from a second format back to a first format, assuming the partition has not increased beyond the size permitted by the first format. This is useful when the user needs to return to an earlier release of software that does not allow tables with partition in the second format.

One advantage of the present invention is that the database system remains operational during the restructuring of the physical storage of a partition of the database.

Another advantage is that the number of blocks in a file containing a partition and the size of each block are not fixed.

Yet another advantage is that a large table need not be restructured at one time or before the table is again usable. Restructuring of a large table having many partitions occurs one partition at a time, thereby minimizing the impact to the users of the large table.

Yet another advantage is that a large table can be created using larger partitions rather than more smaller partitions. Creating a large table with larger partitions rather than more partitions minimizes the complexity of managing the table and thus minimizes the impact to the users of the large table.

Yet another advantage of the present invention is that the table restructuring is not one way, thus making a return to earlier software releases possible. Return to the first format is possible as long as the partitions involved meet the first format size constraints.

BRIEF DESCRIPTION OF THE DRAWINGS

These and other features, aspects and advantages of the present invention will become better understood with regard to the following description, appended claims, and accompanying drawings where:

FIG. 3B is a diagram of the pertinent tables in the catalog of the DBMS;

FIG. 4A is a diagram showing a partition array;

DETAILED DESCRIPTION OF THE INVENTION

Figure 6A:
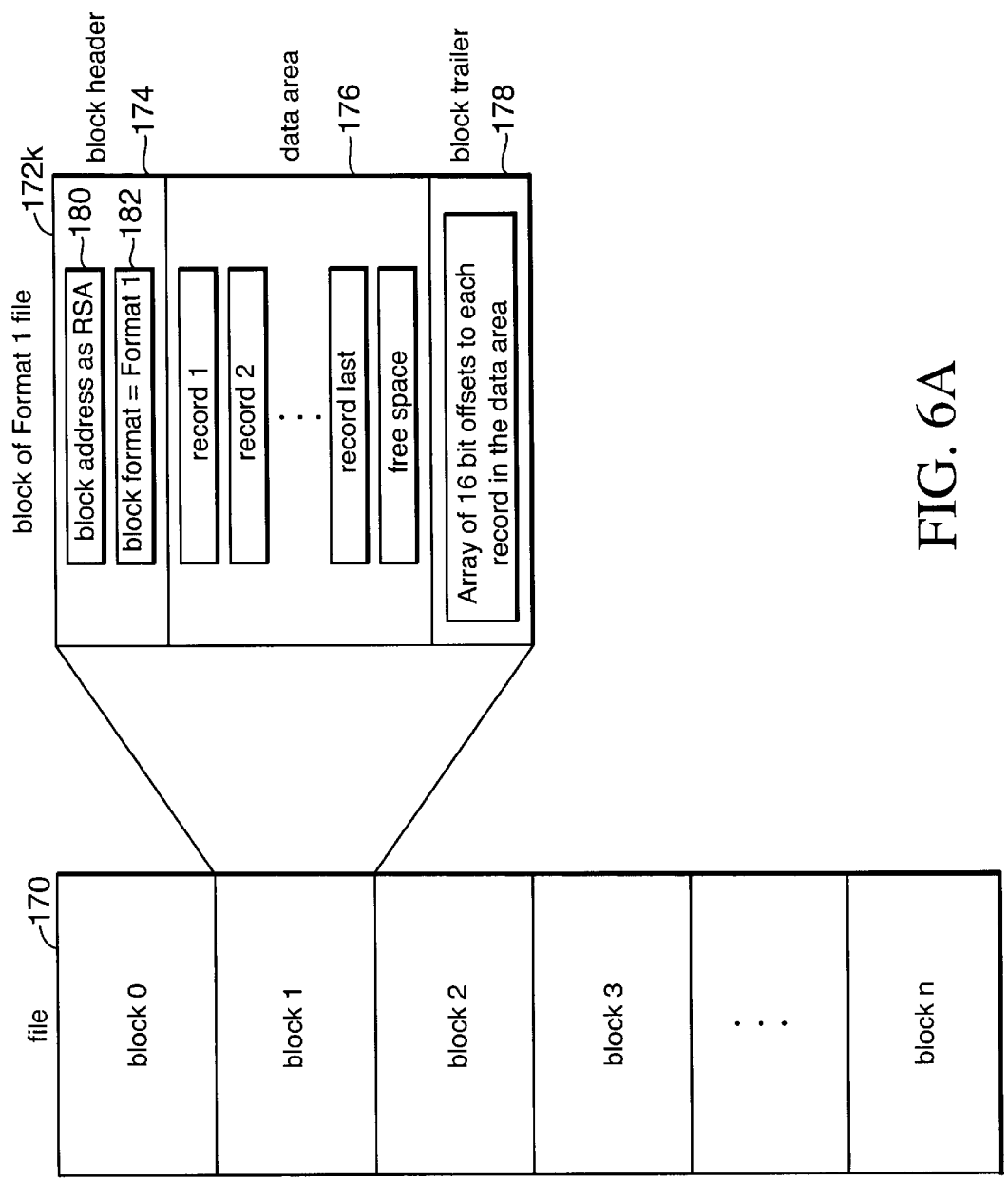
FIG. 6A shows blocks in a file according to a first format.
Figure 6B:
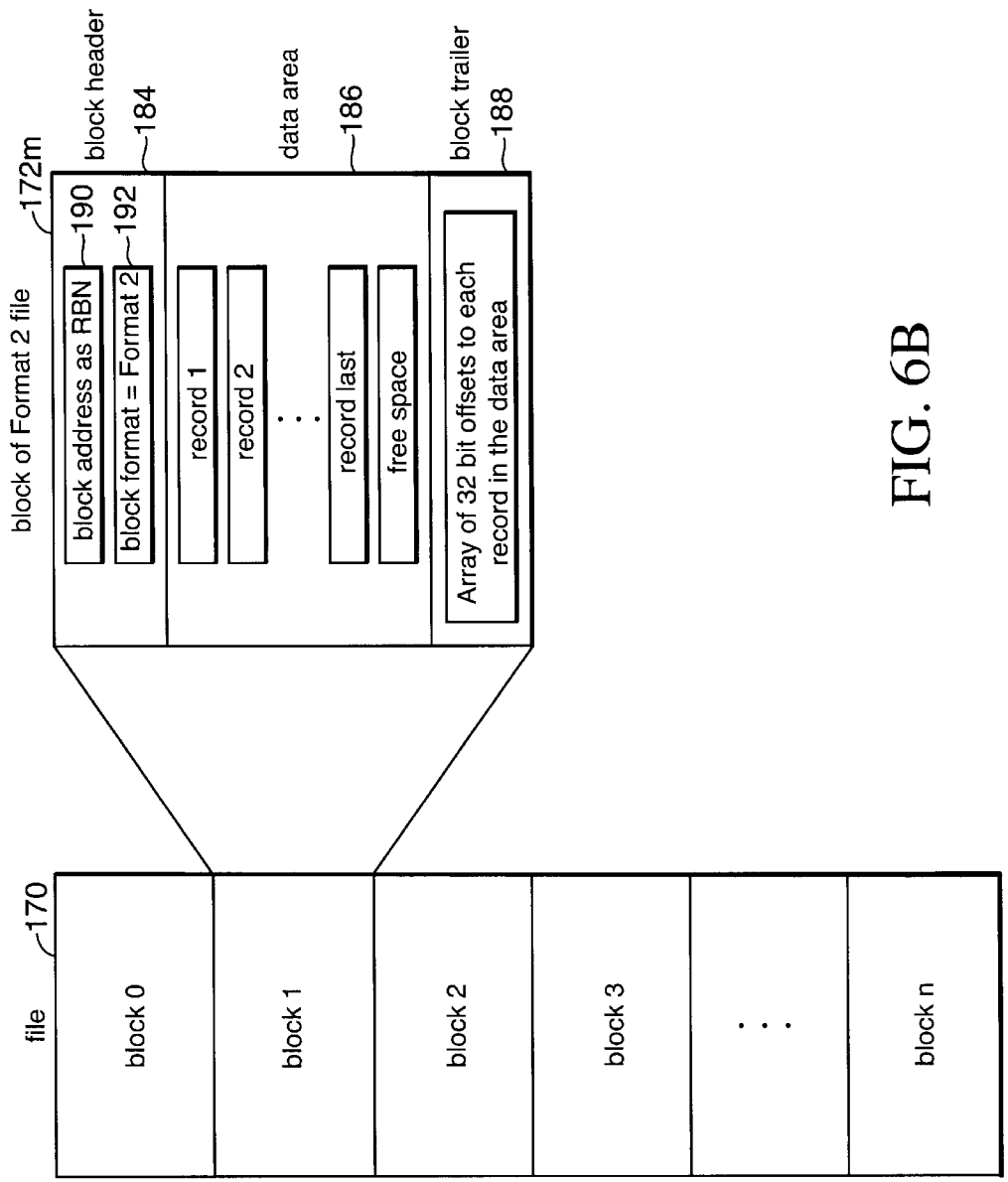
FIG. 6B shows blocks in a file according to a second format.

FIGS. 6A and 6B are diagrams of the formats of the blocks in a file 170. An index block or a data block 172$k$ of a Format 1 or Format 2 file includes a block header 174, a data area 176 and a block trailer 178.

Each block header 174 contains two fields 180, 182 that are pertinent to the present invention, the fields being (i) the address of the block itself 180 and (ii) a format indicator 182 of the block. Blocks in Format 1 files, in FIG. 6A, are addressed with a 24-bit Relative Sector Address (RSA), where a sector is the smallest unit of data transfer to or from a physical disk, say for example 256 bytes. Within a Format 1 file, the byte address of a block is computed by multiplying the RSA by the sector size, in bytes. Blocks 172$m$ in Format 2 files, in FIG. 6B, in accordance with the present invention, are a multiple of the sector size and addressed with a 32-bit Relative Block Number (RBN) 190, thereby increasing the number of blocks by a factor equal to the size of the block. Within a Format 2 file (format indicator 192), the byte address of a block is computed by multiplying the RBN by the block size, in bytes.

Each data area 176, 186 of a data block contains variable-length records whose contents are records of a partition of a table. Index data areas of an index block contain variable length records whose contents are records of the index as part of a B-tree, for example. Each index record contains a key value and the address of another block in the file, the address being stored in 24 bits for blocks belonging to Format 1 partitions and 32 bits for blocks belonging to Format 2 partitions.

Each block trailer 178, 188 contains an array of offsets to the records contained within the data area of the block. The offsets are essentially addresses of the variable-length records within the block. Record offsets in a Format 1 block are stored in 16 bits. Records offsets in Format 2 blocks are stored in 32 bits. Thus, a Format 2 block is capable of storing many more records than a Format 1 block, but as a practical matter the number of records is limited by the size of the Format 2 block, which may be as small as 4096 bytes.

A block 172$k$, 172$m$ may contain free (unused) space in the data area 176, 186. The presence and size of free space depends on the fields defined for the records of the table and the values of those fields in the particular records stored in the data block.

Figure 7:
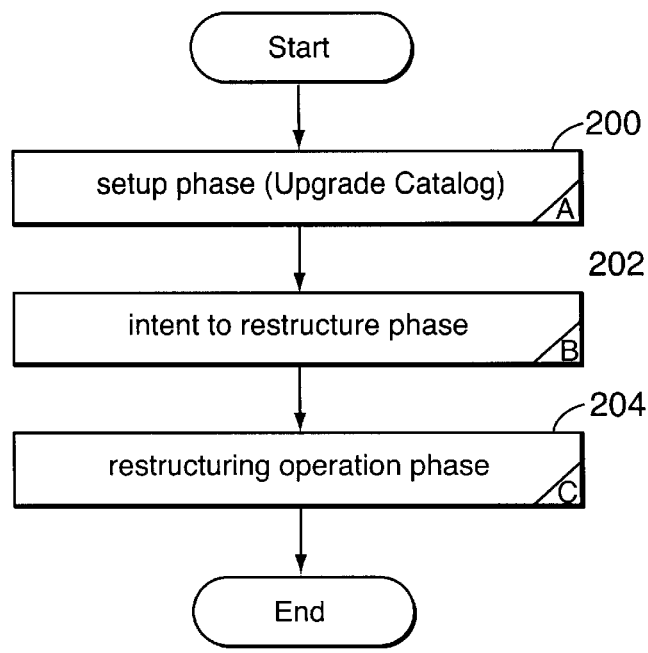
FIG. 7 is a high level flow chart for changing the format of a partition.

FIG. 7 is a high level flow chart for changing the format of a partition. There are thee steps or phases to carry out the change. The first phase is a setup phase (Detail A) 200, during which the FILES table in the Catalog has its schema altered. The second phase (Detail B) 202 is the Intent to Restructure phase, during which the FILES table and the file labels in the data dictionary are updated with new information. The third phase (Detail C) 204 is the phase in which the actual data transformation occurs.

Figure 1:
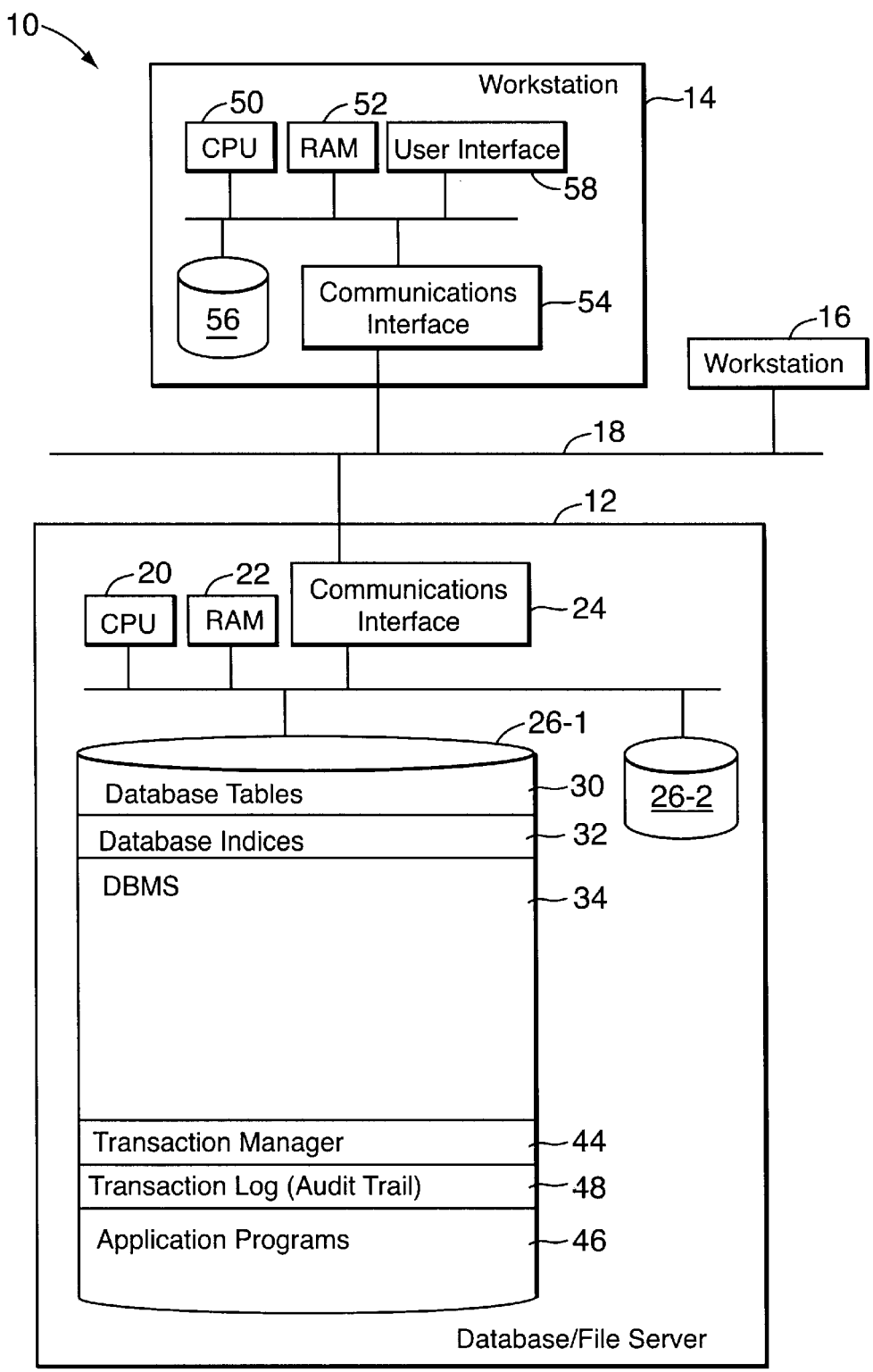
FIG. 1 is a diagram of a computer system having a database management system.
Figure 2:
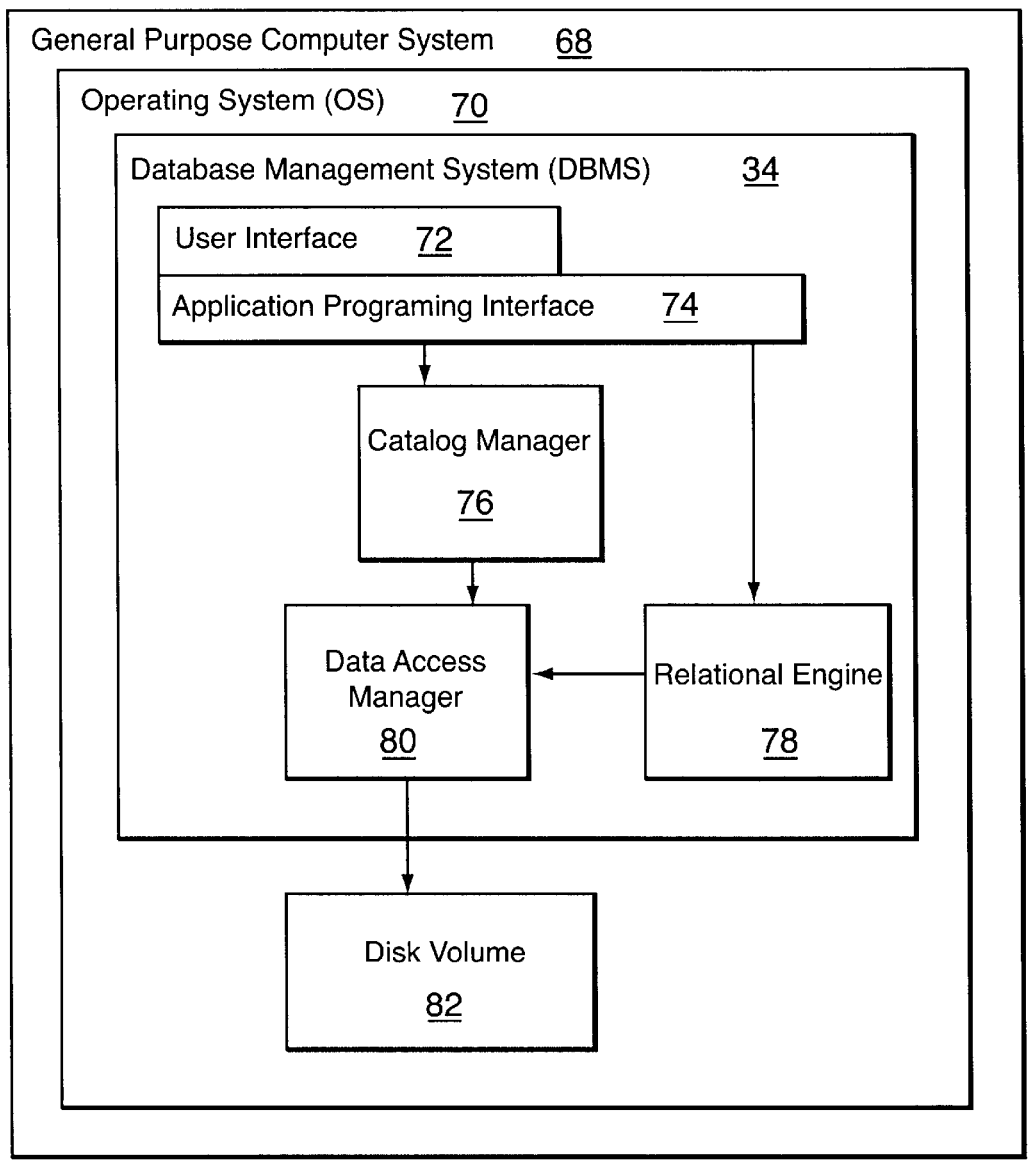
FIG. 2 is a diagram of database management system software.
Figure 3A:
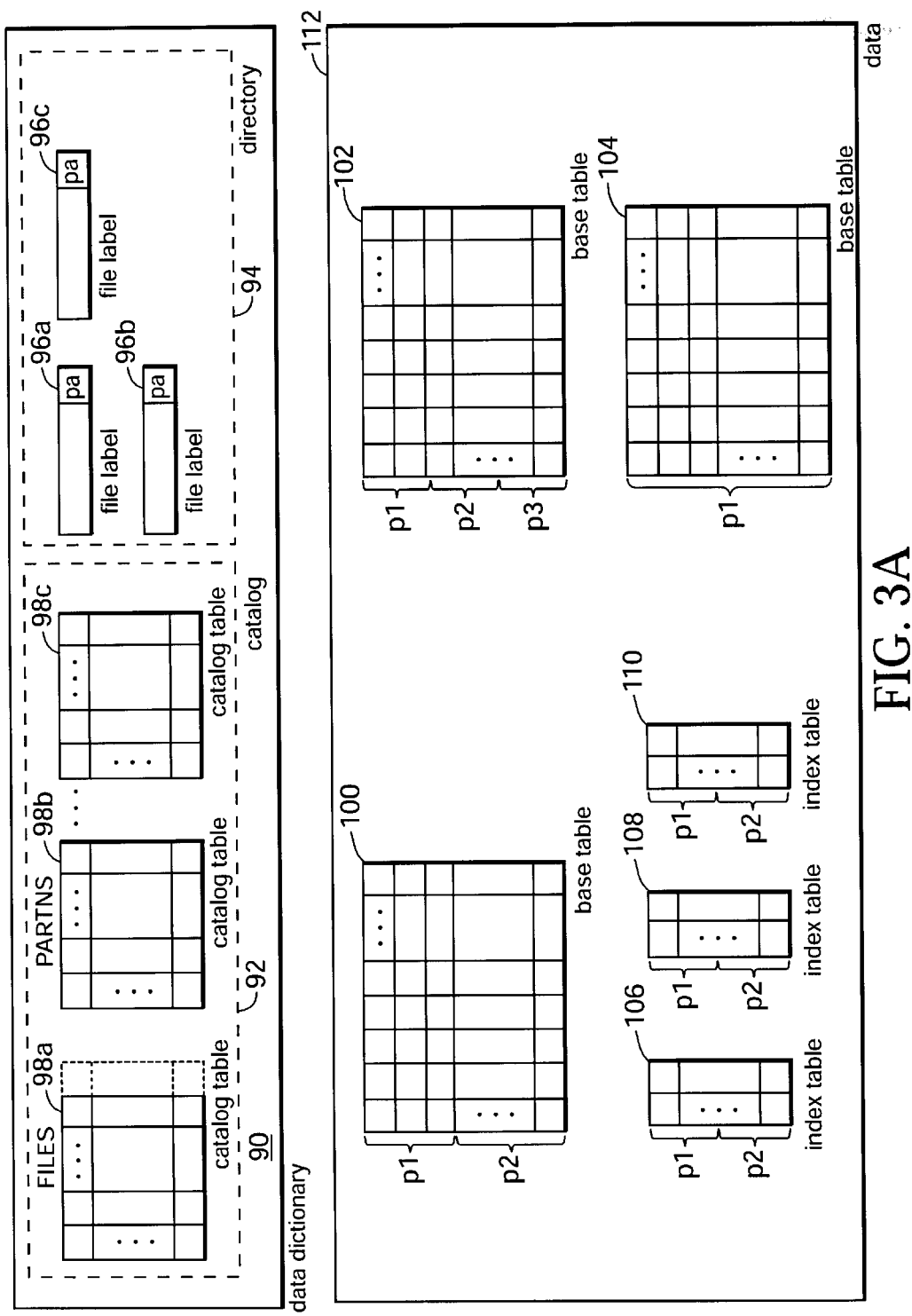
FIG. 3A is a diagram of the pertinent logical structures in the DBMS.
Figure 8A:
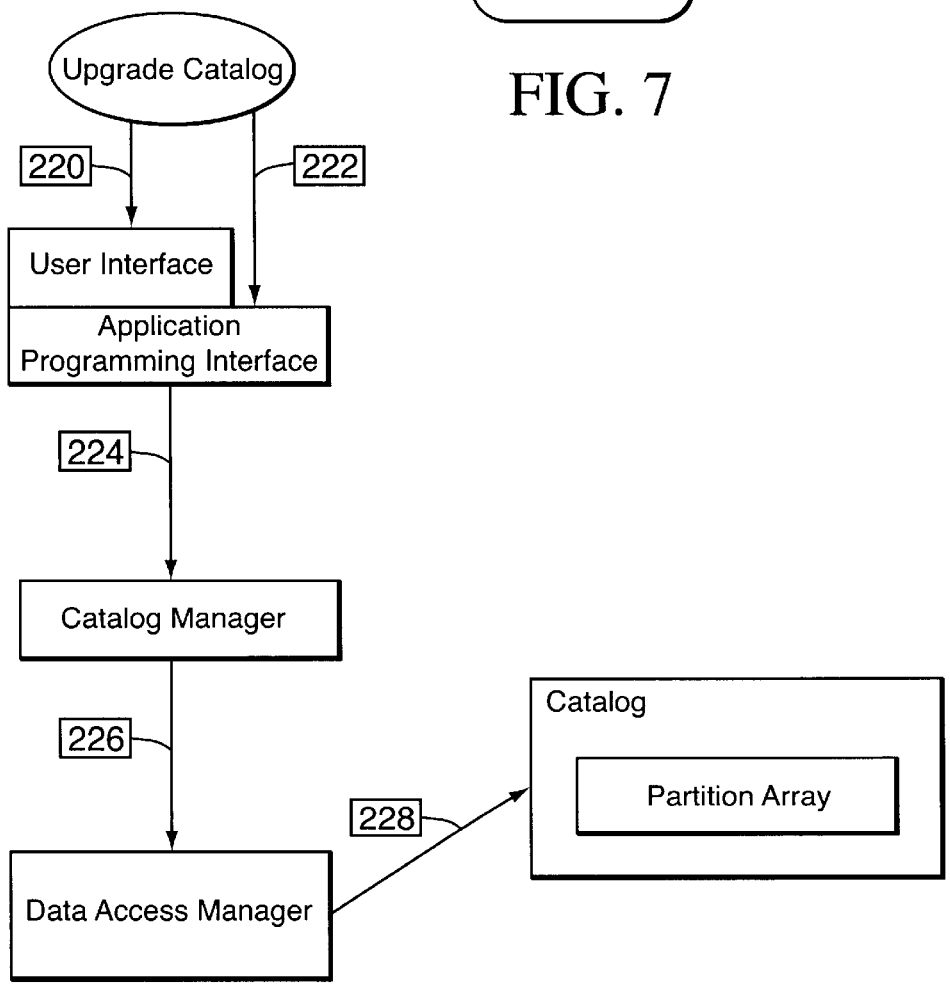
FIG. 8A shows the conceptual flow for carrying out the setup phase of changing the format of a partition.
Figure 8B:
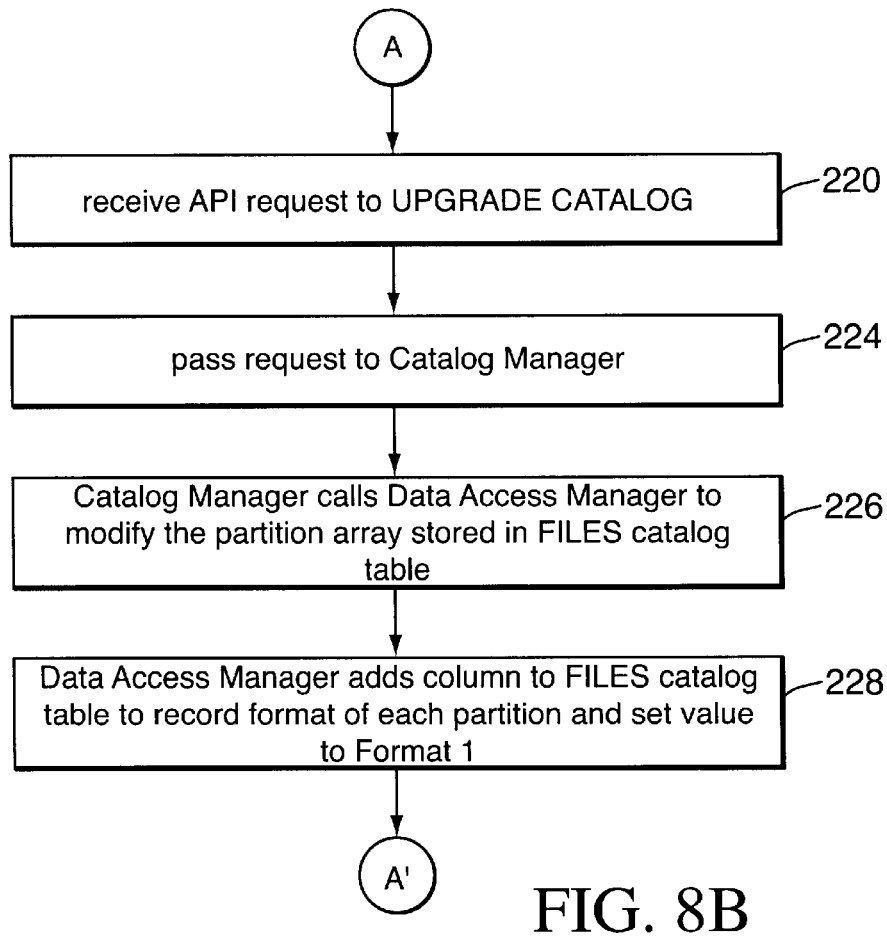
FIG. 8B shows the setup phase.

FIG. 8A shows the conceptual flow for carrying out the setup phase of changing the format of a partition and FIG. 8B (Detail A, entrance into the flow is shown by the connector labeled A and return by the connector labeled A') shows a corresponding flow chart. The setup phase must be performed once per catalog and takes the form of a SQL command, UPGRADE CATALOG. In step 220, the user makes an upgrade request via the user interface. Alternatively, in step 222, a program calls the API directly. In step 224, the API determines that the request is an UPGRADE CATALOG command and passes the request to the Catalog Manager. The Catalog Manager makes calls, in step 226, to the Data Access Manager to modify the FILES catalog table to describe the partition array as being in Format 1 for each partition. In particular, the Data Access Manager modifies, in step 228, the schema of the FILES catalog table by adding a column (field), FILEFORMAT in FIG. 3B, to the table. The added column is designated to store a format value and the value is set to Format 1 to reflect the current format of the partition array in FILES catalog table.

Figure 4B:
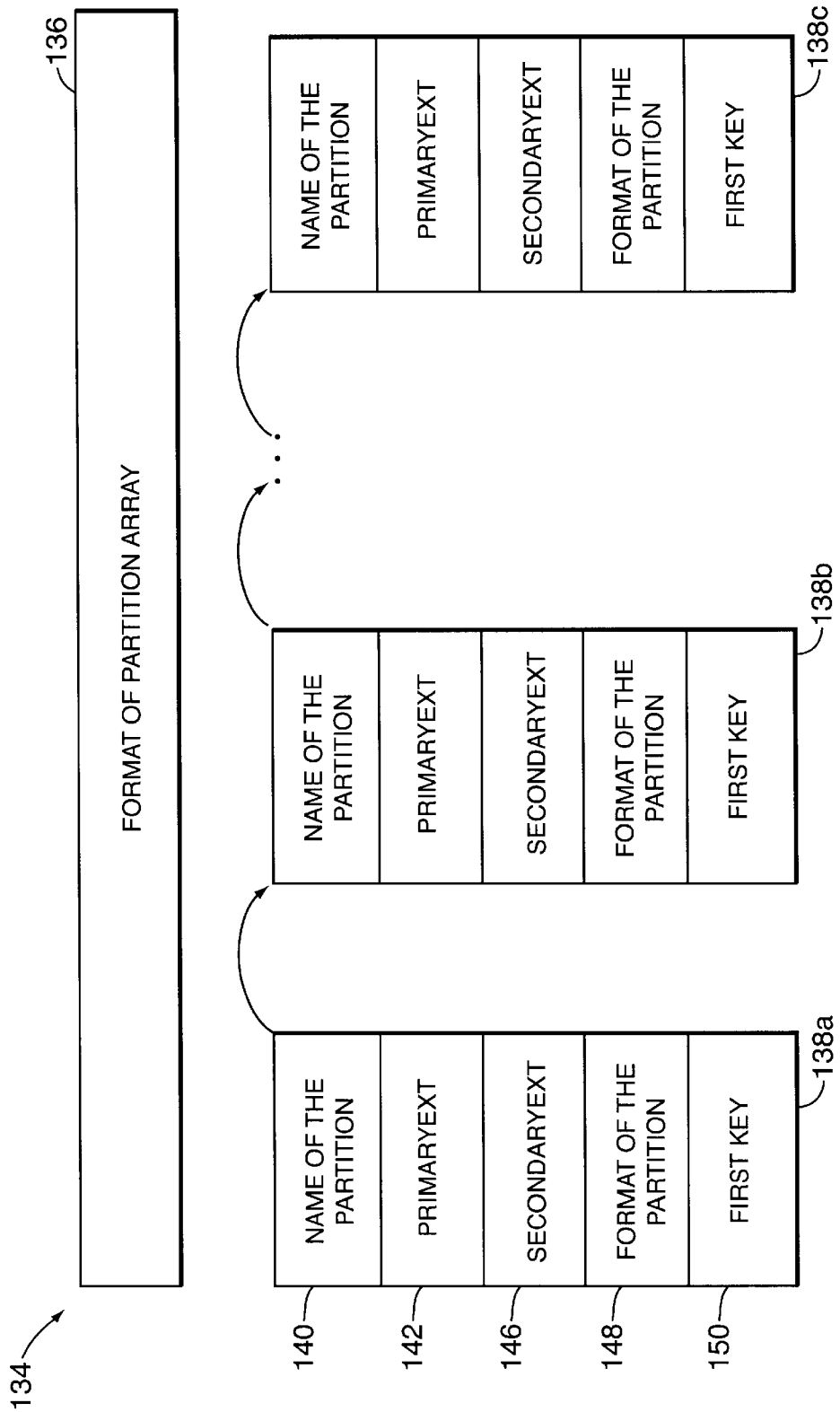
FIG. 4B shows the contents of the elements of a partition array for a Format 1 array.
Figure 4C:
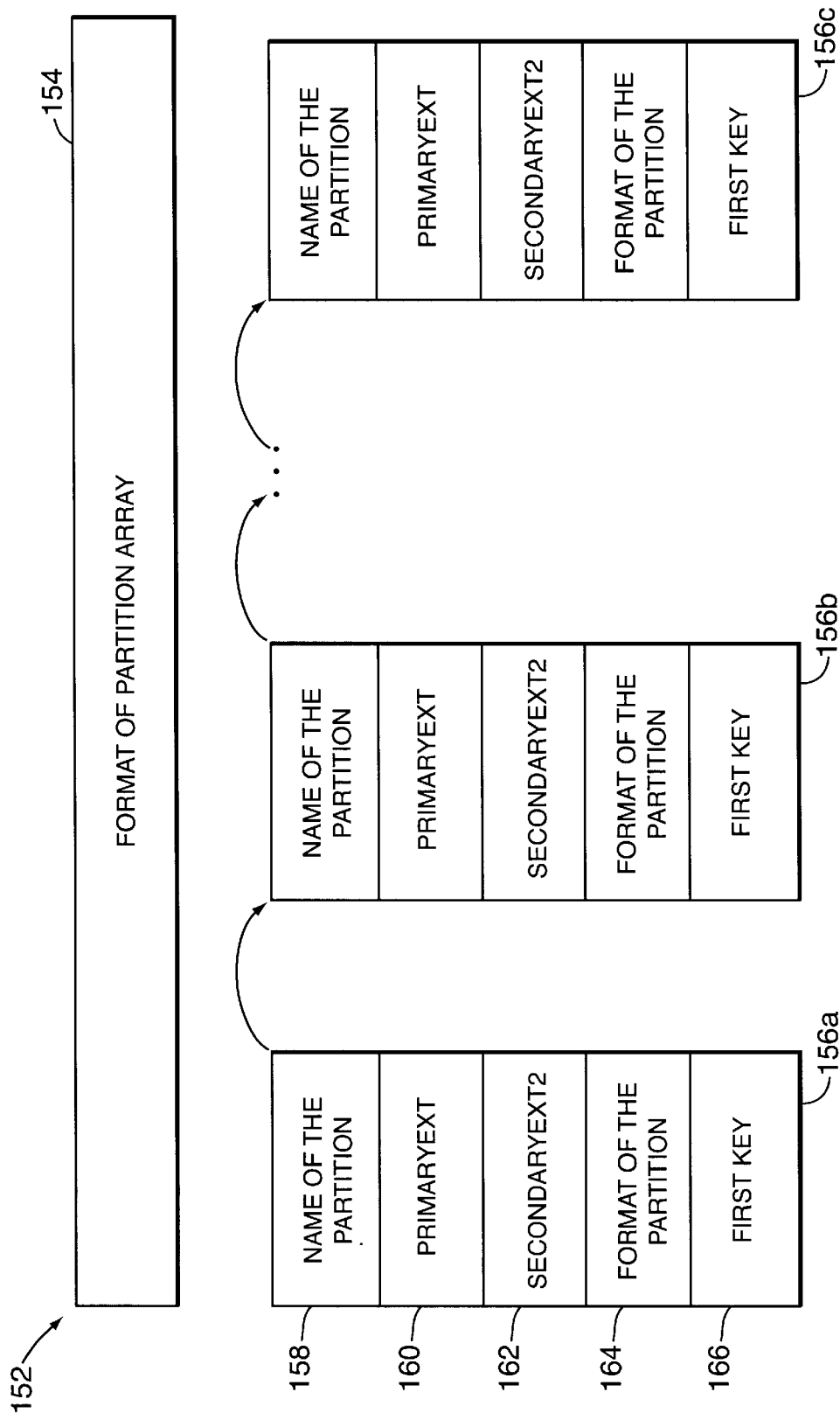
FIG. 4C shows the contents of the elements of a partition array for a Format 2 array.
Figure 5:
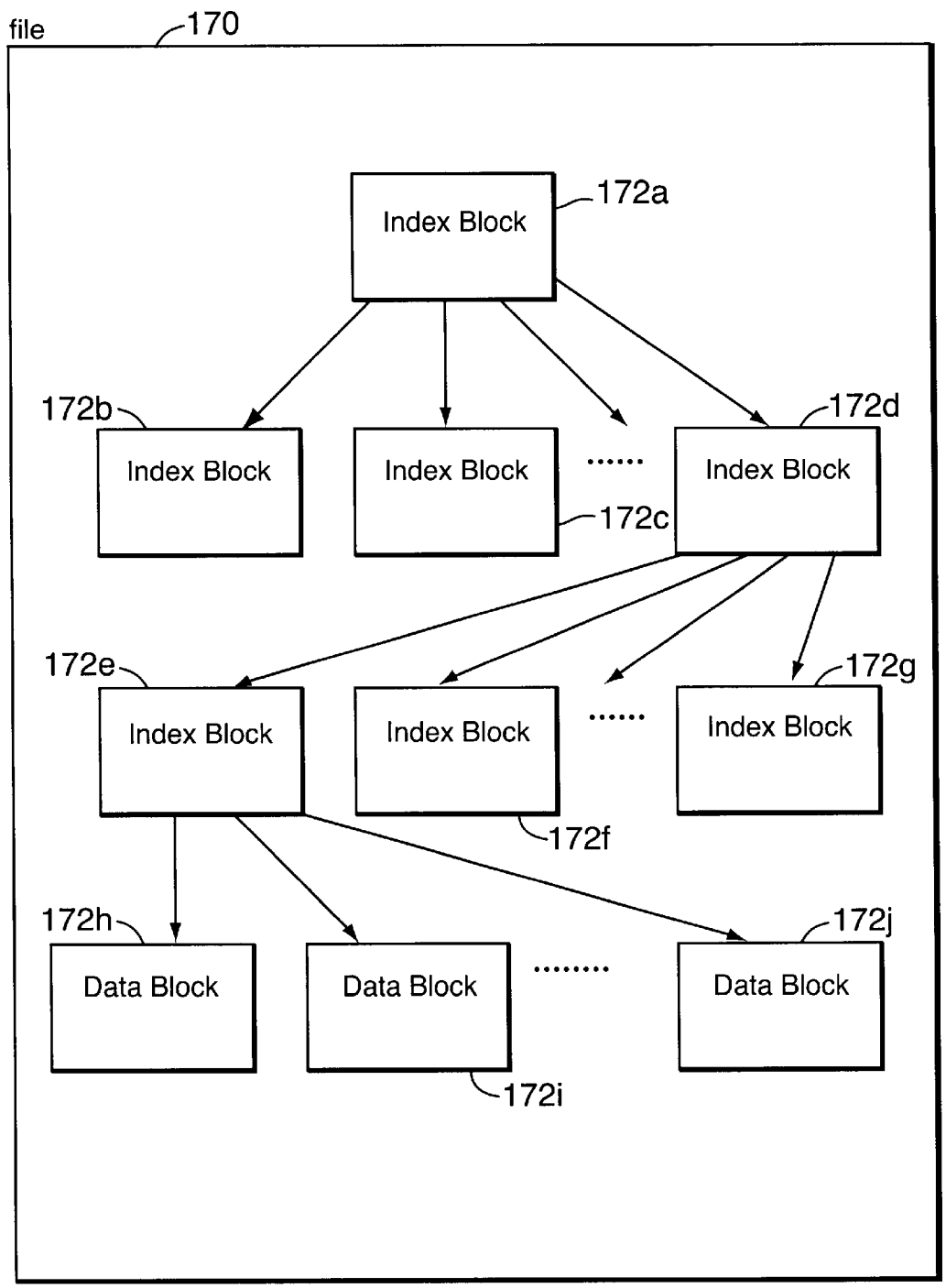
FIG. 5 is a diagram showing index blocks and data blocks in a file.
Figure 9B:
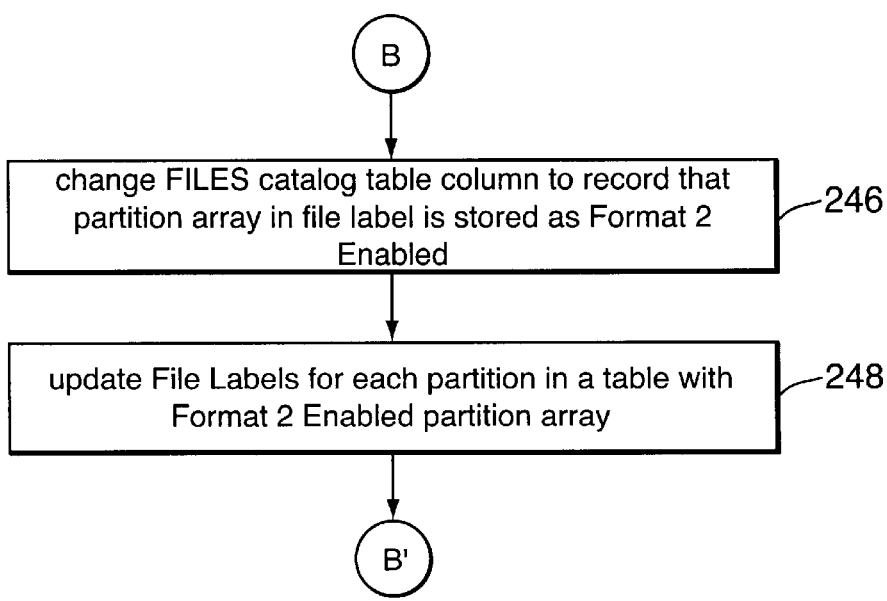
FIG. 9B shows a flow chart for the intent to restructure phase.
Figure 9A:
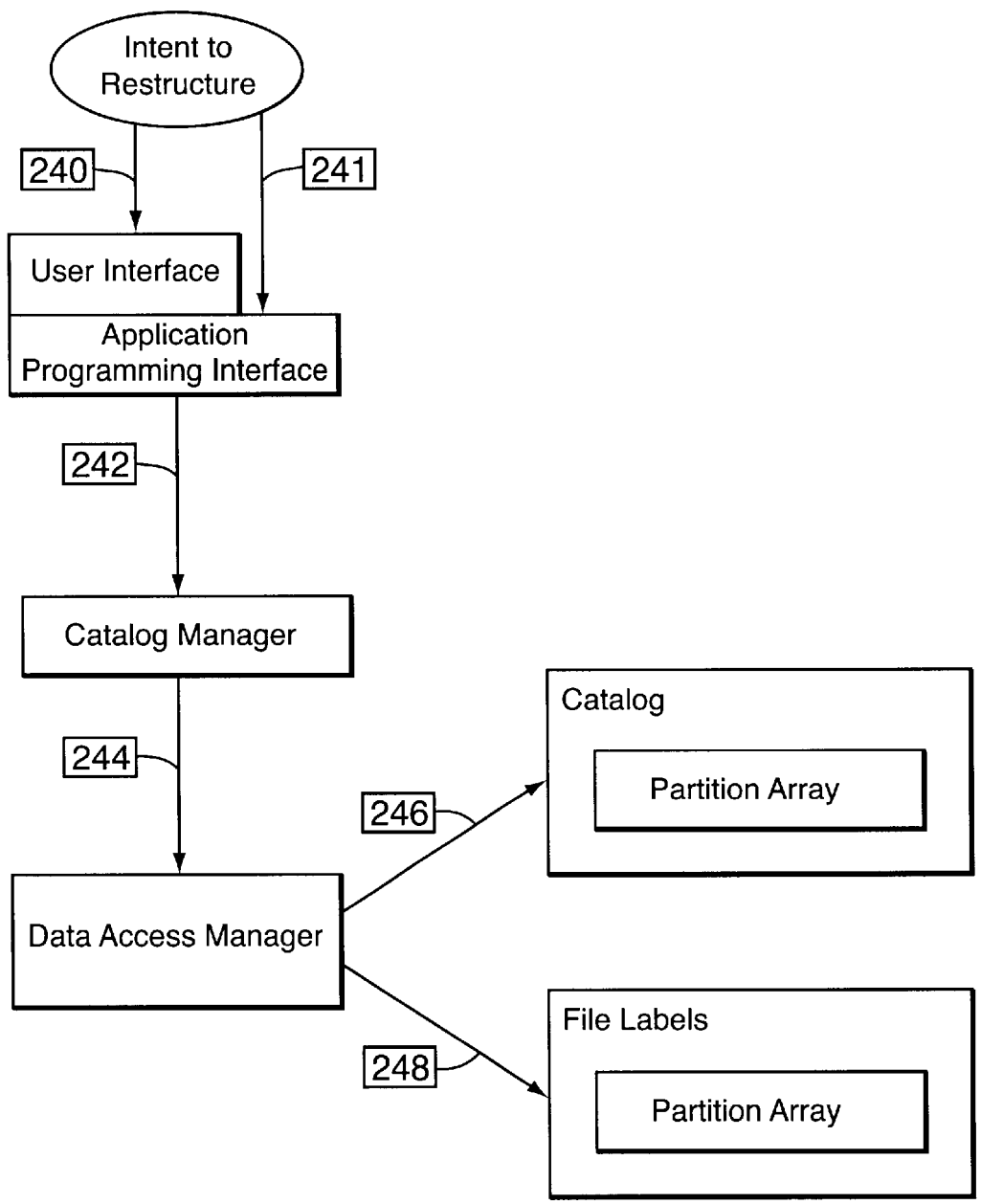
FIG. 9A shows the conceptual flow for carrying out the intent to restructure phase of changing the format of a partition.

FIG. 9A shows the conceptual flow for carrying out the Intent to Restructure phase of changing the format of a partition and FIG. 9B shows a corresponding flow chart for the Intent to Restructure phase. The Intent to Restructure phase is started by the API receiving, in step 240, an 'ALTER TABLE<partitionname>PARTITION ARRAY FORMAT2ENABLED' SQL statement via either the user interface, step 240, or a program step 241. Again, the API passes, in step 242, the Intent to Restructure command to the Catalog Manager which calls upon the Data Access Manager, in step 244, to perform the steps, shown in FIG. 9B, of updating the FILES catalog table, step 246, and updating the file labels in the directory, step 248. In particular, in step 246, a column in the FILES catalog table is changed to record the partition array in the FILES catalog table is stored as a Format 2 Enabled Partition Array. Also, the partition array in each of the file labels for each file storing a partition of the table is updated, in step 248, to record the fact that the partition array is stored as a Format 2 Enabled Partition Array. FIG. 4C is a diagram showing the partition array within the file labels of a Format2Enabled table.

Figure 10A:
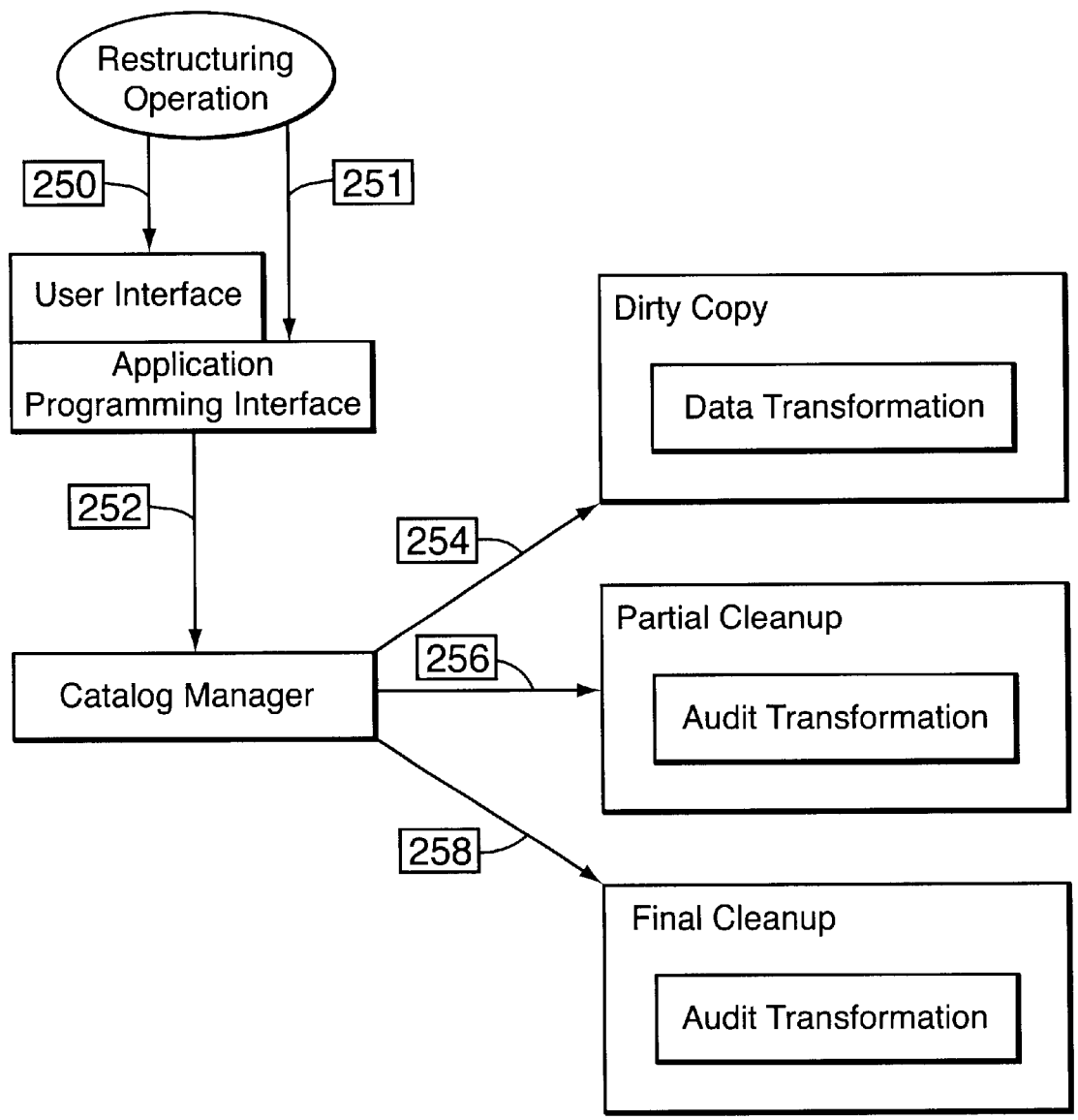
FIG. 10A is a conceptual flow for carrying out the restructuring operation.

FIG. 10A is a conceptual flow for carrying out the restructuring operation. There are thee phases, 254, 256, 258 to performing the restructuring operation, which operation includes moving a partition, a one-way partition split, and two-way split of a partition.

Moving a partition involves moving an entire partition from a first location to a second location on a different volume. In some embodiments, the different volume is on a different disk and other embodiments, the different volume is on the same disk, when the disk is enabled to have multiple volumes resident thereon. The different volume can either be on the same computer node or a different computer node. The old partition has Format 1 and the new partition has Format 2 and blocks of the partition are either data blocks or index table blocks.

The command for moving a partition of a base table is

ALTER TABLE<partitionname>PARTONLY MOVE TO<new partition>FORMAT 2. The command for moving a partition of an index table is ALTER INDEX<indexname>PARTONLY MOVE TO<new partition>FORMAT 2.

A one-way partition split involves moving a portion of a Format 1 partition to a new Format 2 partition. Only the new partition has Format 2; blocks that remain in the old partition stay in Format 1. The partition array and the indexes for the split table must also be adjusted. A partition can be split by specifying a starting key value with the ending key value being the last key value, in the statement ALTER TABLE<partitionname>PARTONLY MOVE FROM KEY<key value>TO<new partition>FORMAT2.

Alternatively, the partition can be split by specifying an ending key value with the starting key value being the first key value, in the statement ALTER TABLE<partitionname>PARTONLY MOVE UP TO KEY<key value>TO<new partition>FORMAT2.

Splitting a partition of an index table is similar using

ALTER INDEX<partitionname>PARTONLY MOVE FROM KEY<key value>TO<new partition>FORMAT2; or ALTER INDEX<partitionname>PARTONLY MOVE UP TO KEY<key value>TO<new partition>FORMAT2.

A two-way split of a partition involves splitting the blocks of the old partition to create two new partitions, each in Format 2. The SQL statement for a base table two-way split is ALTER TABLE<partitionname>PARTONLY MOVE FROM FIRST KEY UP TO KEY<keyvalue>TO<new partition 1>FORMAT 2

MOVE FROM KEY<keyvalue>UP TO LAST KEY TO<new partition 2>FORMAT 2

The SQL statement for an index table two-way split is

ALTER INDEX<partitionname>PARTONLY

MOVE FROM FIRST KEY UP TO KEY<keyvalue>TO<new partition 1>FORMAT 2

MOVE FROM KEY<keyvalue>UP TO LAST KEY TO<new partition 2>FORMAT 2.

In each of these cases, either the user or a program makes a Restructuring Operation request. The API calls the Catalog Manager to perform the three phases of the restructuring operation, the dirty copy phase, the partial cleanup phase and the final cleanup phase. Details of these phases are found in U.S. Pat. No. 5,625,815, issued on Apr. 29, 1997, and entitled "RELATIONAL DATABASE SYSTEM AND METHOD WITH HIGH DATA AVAILABILITY DURING TABLE DATA RESTRUCTURING," which patent is incorporated by reference into the present application.

The Dirty Copy phase (Detail D) 254 involves copying records from an old partition to a new partition while the old partition is actively in use and possibly being changed by the users of the DBMS. Thus, during this copy there is no guarantee that an accurate copy of the records will occur.

The Partial Cleanup (Detail E) phase 256 involves correcting the dirty copying of the records by examining the audit trail and applying changes to the records as needed. Users still have access to the old partition of the database.

The Final Cleanup (Detail F) phase 258 involves actually locking the entire table involved in the partition copy, and, while the table is locked, examining the audit trail to make final changes that ensure a consistent database, after which the table is unlocked and the new partition is ready for regular use as part of the table. Locking the table during the final phase provides for a minimum of disruption to the DBMS users, because the time during which the table is locked is typically very short.

Figures 10B, 10C, 10D:
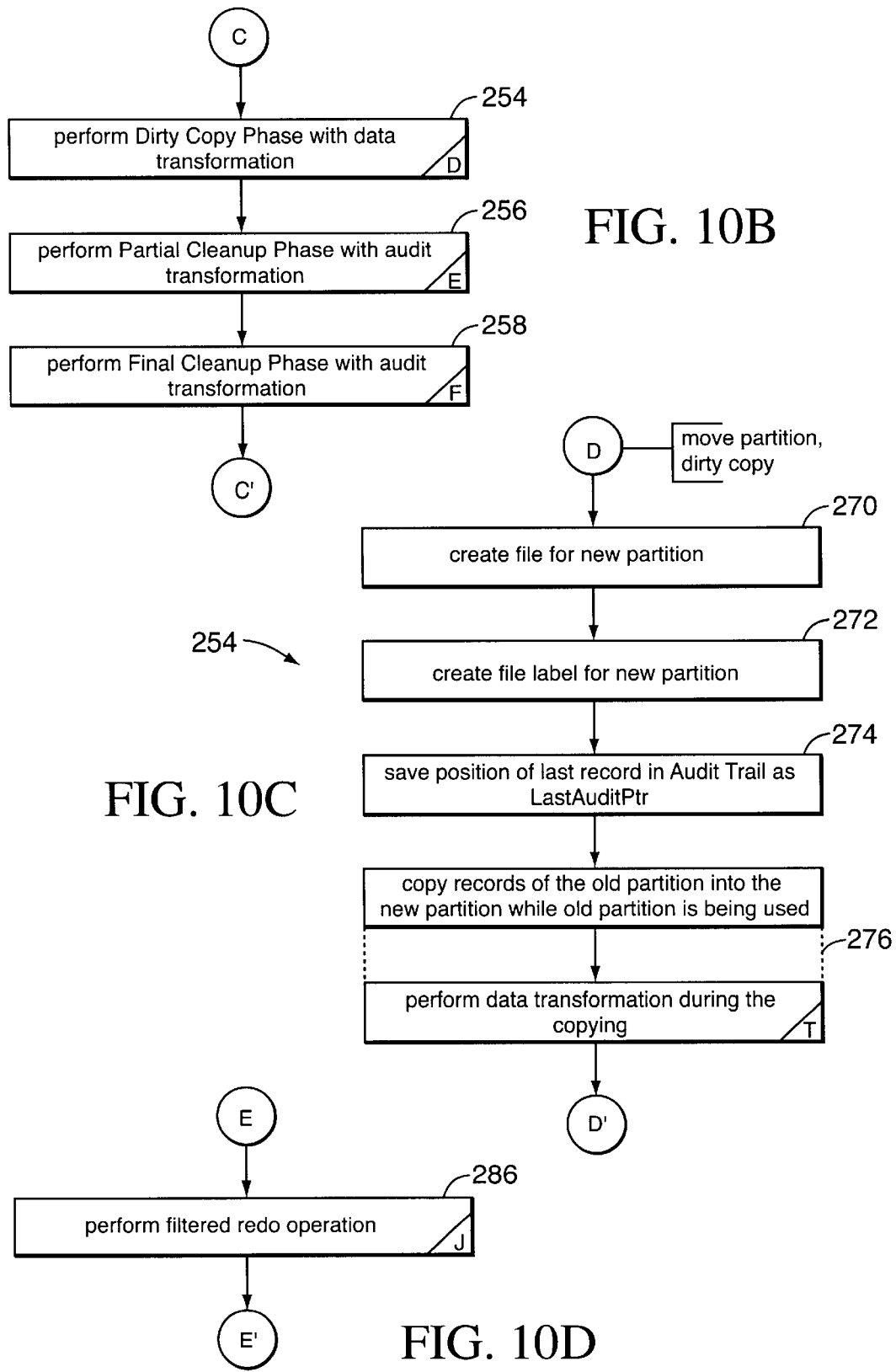
FIGS. 10B–H show a flow chart for carrying out the restructuring operation.

FIGS. 10B–G set forth flow charts for carrying out the restructuring operation in the case of a move partition, in accordance with the present invention. In FIG. 10B, the three phases described above are shown. FIG. 10C (Detail D) sets forth the details of the Dirty Copy Phase 254 with data transformation, FIG. 10D (Detail E) sets forth the details of the Partial Cleanup phase 256 with audit transformation and FIG. 10E (Detail F) sets forth the Final Cleanup Phase 258 with audit transformation.

Detail D

In Detail D, FIG. 10C, first a file for the new partition and associated file label are created, in step 270. Next, the position of the last record in the Audit trail is saved, in step 272, in the AuditPtr variable. Following this, the records of the old partition are copied, in step 276, into the new partition while the old partition is still in use. As part of the copying operation, step 276, a data transformation, in accordance with Detail T, is performed.

Detail T

Figure 10E:
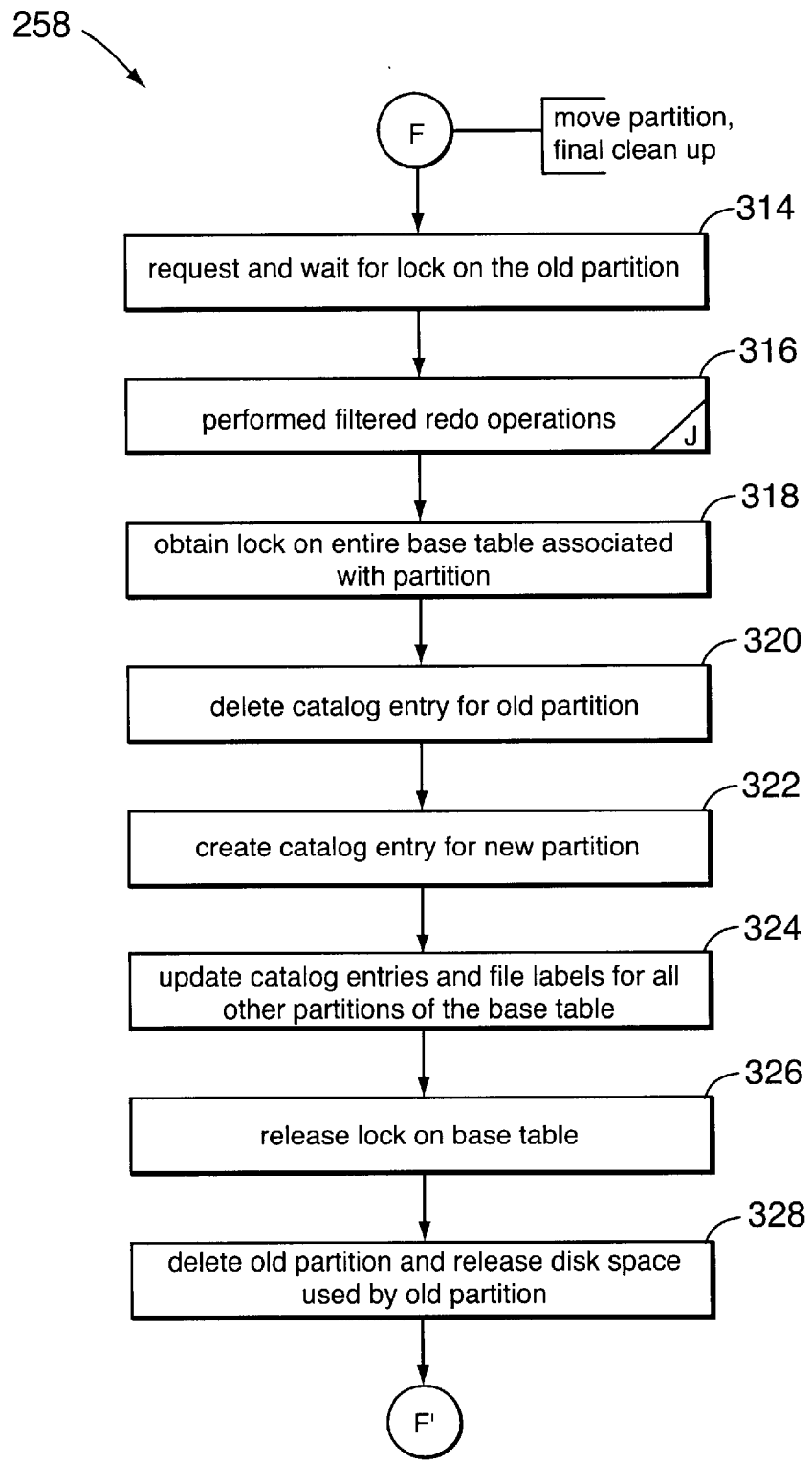
Figure 10F:
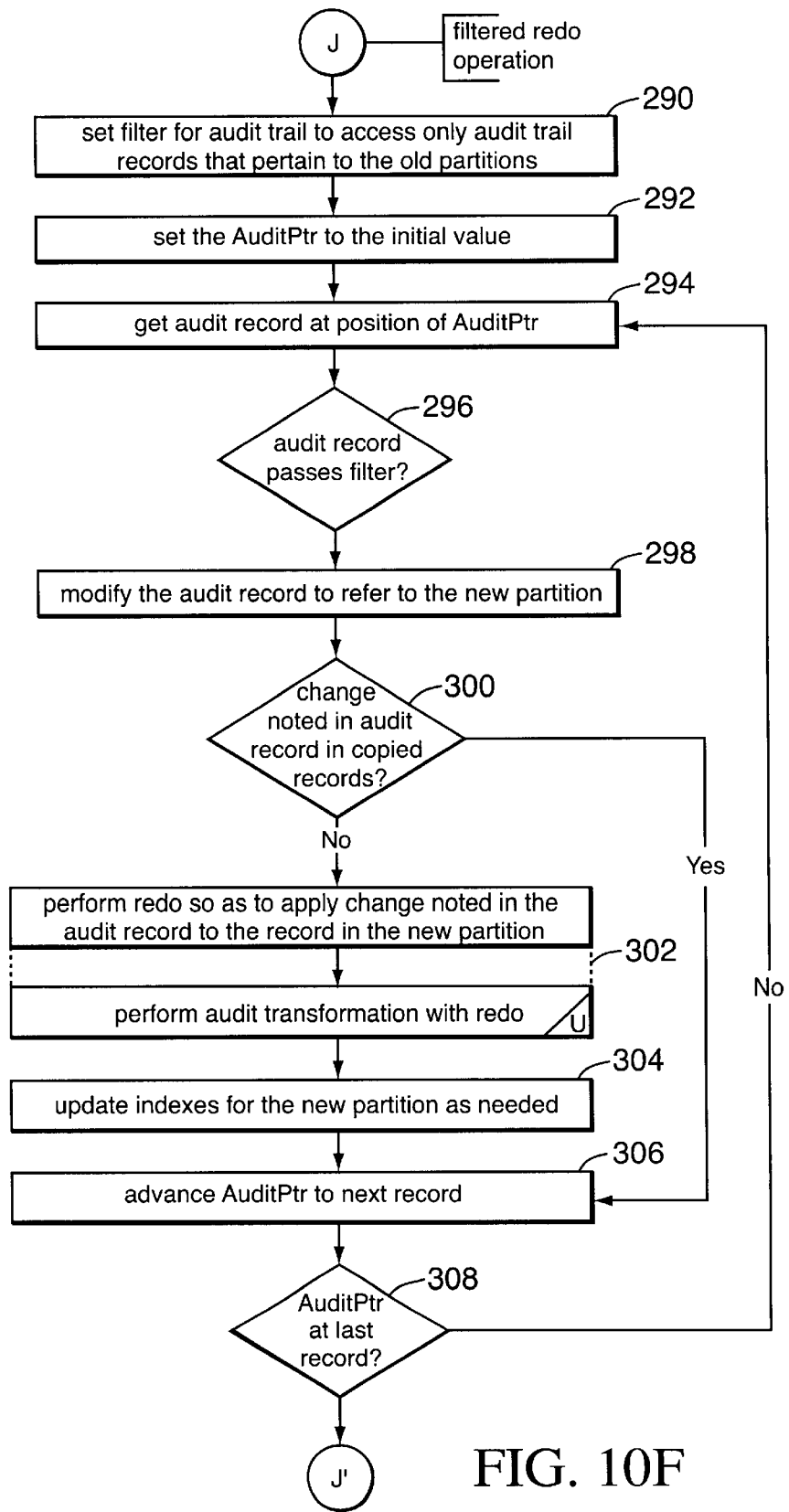
Figure 10G:
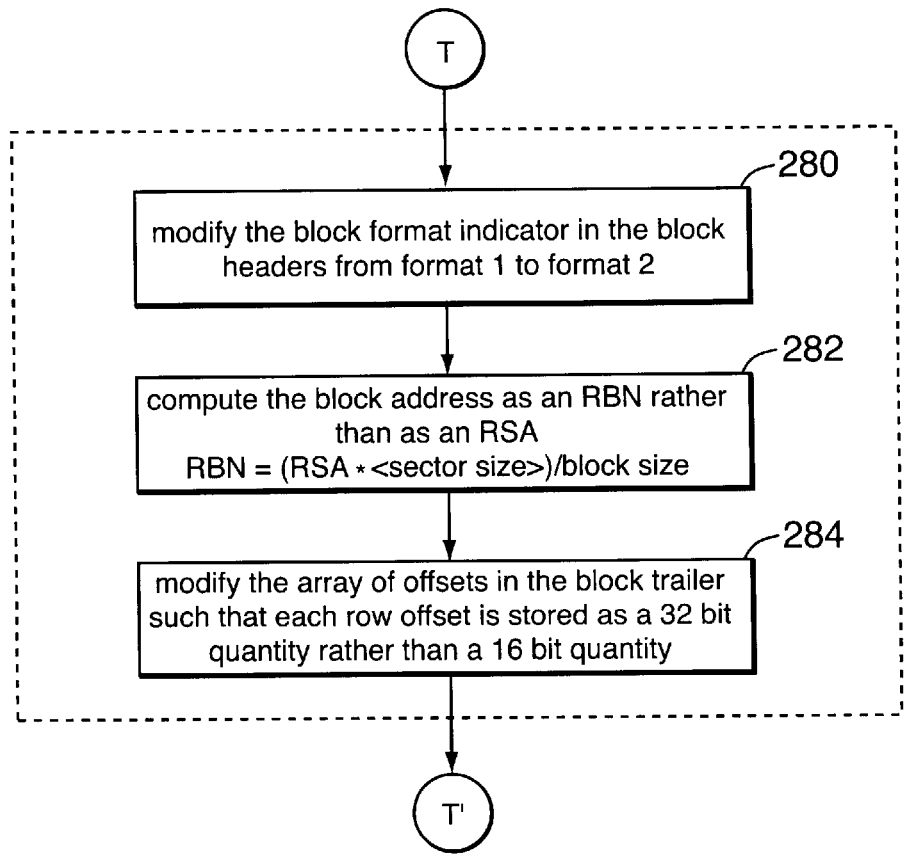

In Detail T, FIG. 10G, the data transformation part of the copying operation includes the steps of modifying, in step 280, the block format indicator in the block headers of each block from Format 1 to Format 2, computing, in step 282, the block address of each block as an RBN and modifying, in step 284, the array of offsets in the block trailer such that each row offset is stored as a 32 bit quantity. Computing the block address as an RBN involves multiplying the RSA by the sector size and then dividing the product by the block size.

Detail E

In Detail E, FIG. 10D, the partial cleanup phase is performed by a filtered redo operation, step 286, Detail J, FIG. 10F, whose steps include setting a filter on the audit trail, in step 290, to access only audit trail records that pertain to the old partition, initializing, in step 292, the AuditPtr to the initial value and obtaining, in step 294, an audit record that passes the filter, as determined in step 296. The obtained audit record is then modified, in step 298, to refer to the new partition and if the copied record does not include the update recorded in the audit record, as determined in step 300, then a redo is performed, in step 302, to apply the update. As part of the redo operation, step 302, an audit record transformation is performed, according to Detail U, FIG. 10H. After the audit record transformation of any redo operation is performed, the indexes for the new partition are updated, in step 304, as needed and the AuditPtr is advanced, in step 306, to the next record. These steps repeat until the last audit record is reached, as determined in step 308.

Detail U

Figure 10H:
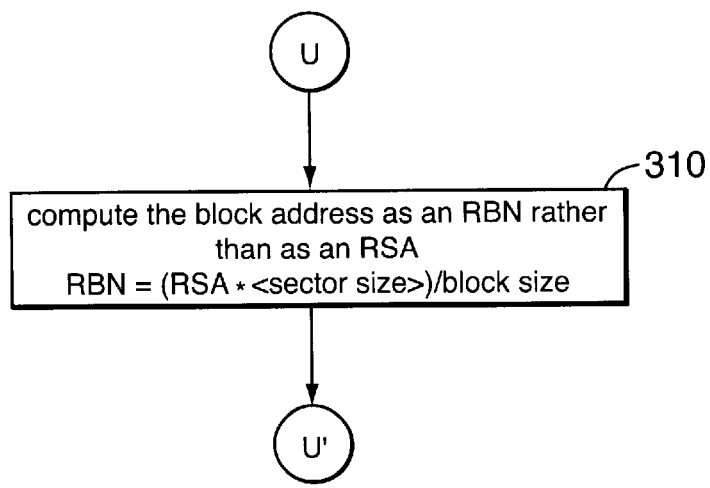

In Detail U, FIG. 10H, the format of an audit record that was used in a redo operation is changed to Format 2. An audit record includes, among other fields, a block address and a record number field for identifying a record which the audit record shows was updated. The block address is adjusted, in step 310, from Format 1 (the RSA) format to Format 2 (the RBN) format so that the data record to which the audit record pertains is correctly identified in the audit record.

Detail F

In Detail F, FIG. 10E, the final cleanup phase is performed. This phase includes the steps of requesting and waiting until a lock on the old partition is obtained, in step 314, then performing a filtered redo operation, in step 316, in accordance with Detail J, FIG. 10F, for changes to the copied records that may have occurred after the second phase was completed. Following this, a lock on the entire table having a partition being moved is obtained, in step 318, the catalog entry for the old partition is deleted, in step 320, and a catalog entry for the new partition is created, in step 322. Next, the catalog entries and file labels are updated, in step 324, for all other partitions of the locked table so as to reference the new partition. In particular, the catalog entries for the new partition are written to indicate that partition is in the new Format2 format and the partition array stored in each file label is updated to indicate that the new partition is in Format2 format. FIG. 4C is a diagram showing the partition array within the file labels of a Format2Enabled table. The table lock is released, in step 326, and as a final step 328, the old partition is deleted and the disk space used by the old partition is freed up for use.

Splitting a partition into a new and old partition is similar to moving a partition except that:

(a) in Detail D, only records in the old partition that have a primary key value meeting the key condition in the SQL statement are copied into the new partition;

(b) in Detail E, the filter for the Audit trail is set to access only audit trail records pertaining to the old partition and having a primary key meeting the key condition in the SQL statement; and (c) in Detail F, the B-tree for the old partition is split into two parts, one for records in the key range of the old partition and one for records meeting the key condition in the SQL statement; records having primary keys meeting the key condition in the SQL statement are made inaccessible in the old partition; and records in the old partition meeting the key condition are deleted from the old partition after the lock on the entire table is released and the transaction is concluded.

Splitting a partition into two new partitions is similar to moving a partition except that:

(a) in Detail D, records from the first key to the key value specified in the SQL statement are copied to a first new partition and records from the specified key value to the last key value are copied to the second new partition; and (b) in Detail F, the B-tree for the old partition is split into two parts, one for records in the key range of the first new partition and one for records in the key range of the second new partition.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of restructuring the physical storage of a table in a database, the table having a plurality of records and one or more partitions into which records of the table are grouped, each partition being stored in a file made up of a number of fixed-size blocks, the database further including control information describing the table, associated files and partitions, and including an audit trail describing updates, if any, to the records of the table, the method comprising:

altering the control information to indicate that each partition of the table has a first format in which each partition is currently stored in a first storage unit;

updating the control information to indicate that each partition of the table is enabled to be stored in a second format;

selecting a partition to be restructured;

copying the blocks of a first file, stored in a first location of the first storage unit and containing the selected partition of the table, from the first storage location to a second file at a second storage location of the second storage unit, while allowing updates to the table, including updates to the selected partition in the first file;

altering the blocks in the second file to have the second format;

updating any records in the selected partition in the second file based on the audit trail, while allowing updates to the table including updates to the selected partition at the first storage location;

locking the table to prevent updates to the table, after updating any records in the second file based on the audit trail;

updating any records in the selected partition at the second storage location based on the audit trail, while the table is locked; and unlocking the table to allow updates to the table including updates to the selected partition at the second storage location.

2. A method for restructuring as recited in claim 1, further comprising deleting the file containing the selected partition at the first storage location, after unlocking the table.

3. A method for restructuring as recited in claim 1, wherein the control information includes at least one catalog table; and wherein the step of altering the control information to indicate that each partition of the table has a first format in which each partition is currently stored includes altering the catalog table to indicate that the partition has the first format.

4. A method for restructuring as recited in claim 1, wherein the control information includes at least one catalog table; and wherein the step of updating the control information to indicate each partition of the table is enabled to be stored in a second format includes entering data into the catalog table to indicate that each partition of the table is enabled to be stored in the second format.

5. A method for restructuring as recited in claim 1, wherein the control information includes one or more file labels for the files associated with the partitions of the table, the file labels each including a partition array that defines the grouping of records of the table; and wherein the step of updating the control information includes updating each of the file labels to record that each of the partitions is enabled to be stored in a second format.

6. A method for restructuring as recited in claim 1, wherein a block in a file includes a block header, a data area and a block trailer, wherein the block header includes a block address and a block format field, the data area includes one or more records of the table, and the block trailer includes an array of addresses, each pointing to one of the records in the data area; and wherein altering the blocks in the second file to have the second format includes the steps of:

altering the block header to indicate in the block format field that the block has the second format;

altering the size of the block address so as to increase the number and size of blocks in a file over the number and size of blocks permitted in the first format; and altering each address in the array of record addresses to be a larger pointer to address a larger number of records in the data area of the block compared to the number permitted in the first format.

7. A method for restructuring as recited in claim 6, wherein each address in the array of addresses in the block trailer is a 32 bit address.

8. A method for restructuring as recited in claim 6, wherein the size of the block address in the block header is a 32 bits.

9. A system for managing a database that includes (i) a plurality of tables, each having a plurality of records, the records of each table being grouped into one or more partitions of each table, (ii) control data describing each of the plurality of tables and the partitions thereof, and (iii) an audit trail describing updates, if any, to the records, the system comprising:

at least two storage units for storing a plurality of files, each file for holding a partition in a number of fixed-size blocks;

a processing unit that connects to the storage units and includes:

a central processor; and a memory containing a program for managing the database, the program being configured to:

alter the control information to indicate that each partition of the table has a first format in which each partition is currently stored in the first storage unit;

update the control information to indicate that each partition of the table is enabled to be stored in a second format;

select a partition to be restructured;

copy the blocks of a first file, stored in a first location of the first storage unit and containing the selected partition of the table, from the first storage location to a second file at a second storage location of the second storage unit, while allowing updates to the table, including updates to the selected partition in the first file;

alter the blocks in the second file to have the second format;

update any records in the selected partition in the second file based on the audit trail, while allowing updates to the table including updates to the selected partition at the first storage location;

lock the table to prevent updates to the table, after updating any records in the second file based on the audit trail;

update any records in the selected partition at the second storage location based on the audit trail, while the table is locked; and unlock the table to allow updates to the table including the updates to the selected partition at the second storage location.

10. A system for managing a database as recited in claim 1, wherein the two storage units reside on a single disk.

11. A computer readable medium having computer-executable instructions for performing a method of restructuring the physical storage of a table in a database, the table having a plurality of records and one or more partitions into which records of the table are grouped, each partition being stored in a file made up of a number of fixed-size blocks, the database further including control information describing the table, associated files and partitions, and including an audit trail describing updates, if any, to the records of the table, the method comprising:

altering the control information to indicate that each partition of the table has a first format in which each partition is currently stored in a first storage unit;

updating the control information to indicate that each partition of the table is enabled to be stored in a second format;

selecting a partition to be restructured;

copying the blocks of a first file, stored in a first location of the first storage unit and containing the selected partition of the table, from the first storage location to a second file at a second storage location of the second storage unit, while allowing updates to the table, including updates to the selected partition in the first file;

altering the blocks in the second file to have the second format;

updating any records in the selected partition in the second file based on the audit trail, while allowing updates to the table including updates to the selected partition at the first storage location;

locking the table to prevent updates to the table, after updating any records in the second file based on the audit trail;

updating any records in the selected partition at the second storage location based on the audit trail, while the table is locked; and unlocking the table to allow updates to the table including updates to the selected partition at the second storage location.

12. A method of restructuring the physical storage of a table in a database, the table having a plurality of records and one or more partitions into which records of the table are grouped, each partition being stored in a file made up of a number of fixed-size blocks, the database further including control information describing the table, associated files and partitions, and including an audit trail describing updates, if any, to the records of the table, the method comprising:

selecting a partition to be restructured, the selected partition being stored in a second file with a second format;

copying the blocks of the second file, stored in a second location of a second storage unit, from the second storage location to a first file at a first storage location of a first storage unit, while allowing updates to the table, including updates to the selected partition in the second file;

altering the blocks in the first file to have a first format;

updating any records in the selected partition in the first file based on the audit trail, while allowing updates to the table including updates to the selected partition at the second storage location;

locking the table to prevent updates to the table, after updating any records in the first file based on the audit trail;

updating any records in the selected partition at the first storage location based on the audit trail, while the table is locked; and unlocking the table to allow updates to the table including updates to the selected partition at the first storage location.

13. A method for restructuring as recited in claim 12, wherein a block in a file includes a block header, a data area and a block trailer;

wherein the block header includes a block address and a block format field, the data area includes one or more records of the table, and the block trailer includes an array of addresses, each pointing to one of the records in the data area; and wherein altering the blocks in the first file to have the first format includes the steps of:

altering the block header to indicate in the block format field that the block has the first format;

altering the size of the block address so as to change the number and size of blocks in a file to that permitted in the first format; and altering each address in the array of record addresses to be a pointer to address a number of records in the data area of the block to that permitted in the first format.

14. A method for restructuring as recited in claim 13, wherein the number and size of blocks in a file permitted in the first format is less than the number and size of blocks permitted in the second format;

wherein the maximum size of the first file is the product of the number of blocks and the size of the blocks permitted in the first format; and wherein the second file has a size does not exceed the maximum size of the first file.

15. A method for restructuring as recited in claim 13, wherein the number and size of blocks in a file permitted in the first format is greater than the number and size of blocks permitted in the second format.

16. A method for restructuring as recited in claim 13, wherein the number of records permitted to be addressed in the data area in the first format is less than the number of records permitted to be addressed in the data area in the second format.

17. A method for restructuring as recited in claim 13, wherein the number of records permitted to be addressed in the data area in the first format is greater than the number of records permitted to be addressed in the data area in the second format.

18. A method for restructuring as recited in claim 12, further comprising deleting the file containing the selected partition at the first storage location, after unlocking the table.

* * * * *